United States Patent
Schmaler

(10) Patent No.: US 12,499,568 B2
(45) Date of Patent: Dec. 16, 2025

(54) PATTERNED INCISION FOIL AND METHOD FOR DETERMINING A GEOMETRY OF AN ANATOMICAL SURFACE

(71) Applicant: Brainlab AG, Munich (DE)

(72) Inventor: Christian Schmaler, Munich (DE)

(73) Assignee: Brainlab AG, Munich (DE)

( * ) Notice: Subject to any disclaimer, the term of this patent is extended or adjusted under 35 U.S.C. 154(b) by 0 days.

(21) Appl. No.: 18/036,553

(22) PCT Filed: Dec. 17, 2020

(86) PCT No.: PCT/EP2020/086724
§ 371 (c)(1),
(2) Date: May 11, 2023

(87) PCT Pub. No.: WO2022/128095
PCT Pub. Date: Jun. 23, 2022

(65) Prior Publication Data
US 2023/0326059 A1    Oct. 12, 2023

(51) Int. Cl.
*G06T 7/60*    (2017.01)
*A61B 46/20*    (2016.01)

(52) U.S. Cl.
CPC .............. *G06T 7/60* (2013.01); *A61B 46/20* (2016.02); *A61B 2046/205* (2016.02); *G06T 2207/30004* (2013.01)

(58) Field of Classification Search
CPC .............. A61B 2034/2065; A61B 2090/3937
See application file for complete search history.

(56) References Cited

U.S. PATENT DOCUMENTS

| | | | | |
|---|---|---|---|---|
| 4,899,762 A | * | 2/1990 | Muller | A61B 90/92 128/850 |
| 6,351,573 B1 | * | 2/2002 | Schneider | G16H 20/40 382/128 |
| 7,853,311 B1 | * | 12/2010 | Webb | A61B 6/4423 128/849 |
| 8,195,272 B2 | * | 6/2012 | Piferi | G01R 33/3415 128/845 |
| 8,620,405 B2 | * | 12/2013 | McClelland | A61B 6/12 378/163 |

(Continued)

FOREIGN PATENT DOCUMENTS

| | | | |
|---|---|---|---|
| DE | 102010011589 A1 | 9/2011 | |
| EP | 4041114 B1 * | 3/2023 | A61B 90/39 |

OTHER PUBLICATIONS

International Search Report and Written Opinion of the International Searching Authority dated Aug. 27, 2021 for Application Serial No. PCT/EP2020/086724, 15 Pages.

*Primary Examiner* — Gandhi Thirugnanam
(74) *Attorney, Agent, or Firm* — Tucker Ellis LLP

(57) ABSTRACT

An incision foil made of a sterile, thin adhesive plastic film with a defined pattern printed on it (e.g. a fine grid pattern) can be stuck e.g. on a patient's skin surface and which marks the anatomical region of interest. Using a camera, images are acquired of the attached film and the deformation of the pattern is digitized. With a computer vision algorithm the surface of the patient, which corresponds to the surface of the film, is reconstructed from the detected pattern features in the images in comparison to the known original undeformed pattern. A method determines a geometry of the surface of the patient using the incision foil.

12 Claims, 7 Drawing Sheets

(56) References Cited

U.S. PATENT DOCUMENTS

| | | | | |
|---|---|---|---|---|
| 10,154,824 B2* | 12/2018 | Fortuna | ............... | A61B 6/547 |
| 10,575,756 B2* | 3/2020 | Schoepp | ............... | A61B 5/061 |
| 10,593,240 B2 | 3/2020 | Hall et al. | | |
| 10,675,116 B2* | 6/2020 | Olive | ............... | A61B 90/39 |
| 10,792,067 B2* | 10/2020 | Baldwin | ............ | A61M 25/065 |
| 11,432,828 B1* | 9/2022 | Lang | ............... | G16H 20/40 |
| 11,553,969 B1* | 1/2023 | Lang | ............... | G02B 27/0172 |
| 12,053,247 B1* | 8/2024 | Chiou | ............... | G06F 3/011 |
| 2003/0018408 A1* | 1/2003 | Sagae | ............. | B29D 11/00432 |
| | | | | 700/200 |
| 2004/0103903 A1* | 6/2004 | Falahee | ............... | A61B 90/39 |
| | | | | 128/849 |
| 2012/0222686 A1* | 9/2012 | Lockwood | ............ | A61B 46/20 |
| | | | | 128/849 |
| 2012/0238864 A1* | 9/2012 | Piferi | ............... | G01R 33/285 |
| | | | | 600/414 |
| 2013/0131505 A1* | 5/2013 | Daon | ............... | A61B 34/20 |
| | | | | 600/426 |
| 2015/0147714 A1* | 5/2015 | Daon | ............... | A61B 6/032 |
| | | | | 600/407 |
| 2015/0223906 A1* | 8/2015 | O'Neill | ............... | A61B 6/0492 |
| | | | | 600/407 |
| 2015/0327948 A1* | 11/2015 | Schoepp | ............... | A61B 34/20 |
| | | | | 600/424 |
| 2016/0278865 A1* | 9/2016 | Capote | ............... | A61B 46/00 |
| 2018/0022948 A1* | 1/2018 | Okajima | ............... | C09D 11/17 |
| | | | | 523/105 |
| 2018/0104014 A1* | 4/2018 | Heindl | ............... | A61B 46/00 |
| 2019/0133692 A1 | 5/2019 | Mariampillai et al. | | |
| 2020/0078097 A1* | 3/2020 | Gregerson | ............ | B25J 9/1666 |
| 2020/0405399 A1* | 12/2020 | Steinberg | ............... | G06T 7/33 |
| 2021/0192759 A1* | 6/2021 | Lang | ............... | A61B 90/98 |
| 2022/0079675 A1* | 3/2022 | Lang | ............... | G02B 30/52 |
| 2023/0240628 A1* | 8/2023 | Cohen | ............... | A61B 6/4441 |
| | | | | 382/128 |
| 2023/0326059 A1* | 10/2023 | Schmaler | ............... | A61B 34/20 |
| | | | | 382/128 |
| 2024/0307122 A1* | 9/2024 | Tolkowsky | ............... | G06T 7/33 |

\* cited by examiner

PATTERNED INCISION FOIL AND METHOD FOR DETERMINING A GEOMETRY OF AN ANATOMICAL SURFACE

RELATED APPLICATION DATA

This application is a National Phase application of International Application No. PCT/EP2020/086724, filed Dec. 17, 2020, the contents of which are incorporated herein by reference.

FIELD

The present invention relates to an incision foil, a system comprising the incision foil and a detection device for detecting a pattern present on the incision foil, and a computer-implemented method of determining the geometry of an anatomical surface, a corresponding computer program, a computer-readable storage medium storing such a program and a computer executing the program.

BACKGROUND

The invention supports acquisition of a precise digital surface model of a patient or some patient anatomy for example before a surgical procedure in an operating room. Such a surface model is a digital representation of the topography of the patient's skin at the time the model is acquired. A precise surface model can serve multiple purposes in the medical field and especially during a surgical procedure:
  a) Registering digital patient data in which the same anatomy is captured and detected, to the real patient in the process of surface matching, e.g. for image guided surgery. This patient data could be a volumetric data set acquired by MRI/CT/other imaging modalities.
  b) Visualization: Knowledge of the topography of the patient's skin is often essential in correctly visualizing medical data sets and creating visualizations which show specific details depending on the medical use case. Especially with respect to augmented reality or mixed reality visualization scenarios it is important to know where the real patient surface is so that virtual content inside and outside the patient can be correctly blended with reality. Advanced visualizations with depth-dependent blending and occlusion of virtual and real objects are essential for a good depth perception of the user.
  c) Updating previously acquired patient data or models to the current posture. For instance, updating a pre-operative image dataset, e.g. CT scan, or models of an organ or other anatomical structures, e.g., a model of the patient's spine, which were generated from such pre-operative image data, to the actual posture and spine curvature the patient has when being positioned on the OR table.

Depending on the use case, different techniques have been used to achieve the purposes described above:
  a) Registration: Various methods exist to register patient data to the actual patient anatomy
    1. Paired point registration
    2. Surface matching using a point cloud acquired by a tracked instrument (e.g., Brainlab Softouch®) or a laser beam (e.g., Brainlab z-Touch®)
    3. Intra-operative registration scan (e.g., Universal AIR) using various imaging modalities
    4. Surface matching using structured light
  b) Visualization/Augmented/Mixed Reality:
    1. Skin surface is reconstructed from image data (CT) using thresholding
    2. Depth sensor/TOF (Time of flight)
    3. Surface reconstruction with mono-/stereo photogrammetry
  c) Posture update/Spine curvature correction:
    Intra-operative scan and elastic image fusion (e.g., Brainlab Spine Curvature correction)

Depending on use case (see previous section):
  a) Registration such as paired point registration (may, however, be invasive and requires access to anatomical landmarks) or by a cumbersome manual process (which takes time and requires additional equipment, for example for tracking a pointing tool), or by surface matching (this, however, may require an intraoperative scan for registration, involves high effort and leads to radiation exposure of the patient and personnel) or by applying a structures light imaging modality (which however, also needs addition equipment such as a projector and a camera).
  b) Visualization/Augmented/Mixed Reality:
    1. Skin reconstruction from image data (however, the patient anatomy in pre-operative image data might not correspond to intra-operative patient position (e.g., in the case of spinal surgery, also intra-operative image data has often very small field of view that contains little or even no skin surface
    2. using a depth sensor (TOF) (which is associated with a coarse resolution and a certain inaccuracy)
    3. using photogrammetry (which, however, is associated with accuracy problems and is computationally expensive and therefore little suitable for real-time processing)
  c) Posture and curvature update (which, however, is associated with an intra-operative scan leading to effort and radiation exposure for patient and personnel)

The present invention has the object of providing an efficient and safe procedure for determining an updated surface model of an anatomical body part of a patient.

The present invention can be used for medical procedures e.g. in connection with a system for image-guided radiotherapy such as VERO® and ExacTrac®, both products of Brainlab AG, or the following products of Brainlab AG: Spinal Navigation, Cranial Navigation, even orthopedic or ENT Navigation (on various platforms, Curve, Buzz, Kick), Brainlab Mixed Reality.

Aspects of the present invention, examples and exemplary steps and their embodiments are disclosed in the following. Different exemplary features of the invention can be combined in accordance with the invention wherever technically expedient and feasible.

EXEMPLARY SHORT DESCRIPTION

In the following, a short description of the specific features of the present invention is given which shall not be understood to limit the invention only to the features or a combination of the features described in this section.

The present disclosure encompasses an incision foil made of a sterile, thin adhesive plastic film with a defined pattern printed on it (e.g. a fine grid pattern) which can be stuck e.g. on a patient's skin surface and which marks the anatomical region of interest. Using a camera, images are acquired of the attached film and the deformation of the pattern is digitized. With a computer vision algorithm the surface of the patient, which corresponds to the surface of the film, is reconstructed from the detected pattern features in the images in comparison to the known original undeformed pattern. The present disclosure also relates to a method for determining a geometry of the surface of the patient using the incision foil.

GENERAL DESCRIPTION

In this section, a description of the general features of the present invention is given for example by referring to possible embodiments of the invention.

In general, the invention reaches the aforementioned object by providing, in a first aspect, an incision foil (for example, a medical or surgical incision foil) having a first side comprising an adhesive portion. The incision foil also has a non-adhesive second side opposite the first side (i.e. on the other side of the incision foil). For example, the adhesive portion is self-adhesive. The foil is made of for example a plastic material which is formed for example into a thin film and which can for example be sterilised. The incision foil can be placed on an anatomical body part on which a surgical procedure shall be carried out, and serve as a sterile drape covering the area around the surgical situs. For example, the incision foil is a surgical drape or part of a surgical drape. For example, the incision foil is placed on the anatomical body part with the adhesive side facing the anatomical body part so as to fix the position of the incision foil on the anatomical body part. The incision foil can be cut, e.g. using a scalpel, to allow access to the situs through the cut. A pattern is provided on the incision foil. The pattern is for example optically detectable using an electronic detection device, for example a camera such as a monoscopic or stereoscopic camera. For example, the pattern provides an optical contrast against the portion of the non-adhesive side. For example, the pattern, for example a graphical pattern, is provided on a portion of the non-adhesive side at a position opposite the adhesive portion. For example, the pattern is printed or painted on the incision foil.

In an example of the first aspect, the appearance of the pattern changes, for example is configured to change, when the incision foil is deformed. For example, topography, for example the macroscopic topography, of the foil changes, for example is configured to change, when the incision foil is deformed. For example, the foil cannot be stretched or compressed at least substantially, so that the surface area of the foil remains constant at least substantially during deformation. For example, the pattern is regular, for example symmetric or periodic, for example in regard of its spatial arrangement. In another example of the first aspect, the pattern is irregular, for example unsymmetric or aperiodic, for example in regard of its spatial arrangement. In examples of the first aspect, the pattern is at least one of chequered, striped, dotted, a grid-shaped pattern, a pattern rendered in different levels of a greyscale, rendered in different line thicknesses, or rendered in different dot sizes. For example, the pattern comprises a stripe index code or a grid index code, for example a bar code or a QR code. For example, a spatial frequency spectrum of the pattern has a peak at a value suitable for detection by a camera, for example in accordance with a spatial resolution of a camera.

In a second aspect, the invention is directed to a system, comprising the incision foil according to the first aspect. The system also comprises a detection device for detecting the pattern and a computer operably coupled to the detection device for receiving, from the detection device, electronic signals describing the appearance of the pattern detected by the detection device and configured to determine the geometry of the incision foil on the basis of the electronic signals received from the detection device.

In an example of the second aspect, the system further comprises an electronic data storage device storing pattern template data a predetermined pattern in a known geometry of the incision foil. The computer is operably coupled to the detection device for receiving, from the detection device, pattern detection data describing the appearance of the pattern detected by the detection device and to the electronic data storage device for receiving, from the electronic data storage device, the pattern template data. Furthermore, the computer is configured to determine, based on the pattern detection data and the pattern template data, surface geometry data describing a geometry of the incision foil.

In an example, the system according to the second aspect comprises the incision foil and the detection device is a camera, for example a monoscopic or stereoscopic camera.

In a third aspect, the invention is directed to a computer-implemented medical method of determining the geometry of an anatomical surface of an anatomical body part. The method according to the third aspect comprises executing, on at least one processor of at least one computer (for example at least one computer being part of a navigation system), the following exemplary steps which are executed by the at least one processor.

In a (for example first) exemplary step, pattern detection data is acquired which describes the appearance of the pattern provided on the incision foil according to the first aspect, the adhesive portion of the incision foil being attached to the anatomical surface.

In a (for example second) exemplary step, surface geometry data is determined based on the pattern detection data, wherein the surface geometry data describes the geometry of the anatomical surface. For example, the surface geometry data has been determined by surface reconstruction using mono- or stereo-photogrammetry.

In an example, the method according to the third aspect, comprises acquiring pattern template data describing a predetermined, for example known, appearance of the pattern in a predetermined, for example known, geometry of the incision foil. In this example, the method further comprises determining, based on the pattern detection data and the pattern template data, surface geometry data describing a geometry of the anatomical surface.

In an example, the method according to the third aspect comprises acquiring planning image data describing a medical image defining a geometry of the anatomical body part. In this example, the method further comprises determining, based on the planning image data and the surface geometry data, body part deformation data describing a deformation of the geometry of the anatomical body part defined by the medical image. For example, the surface geometry data describes a deviation between the geometry of the anatomical surface as detected by the detection device and the predetermined appearance of the pattern. The information about the deviation may be used to adapt for example a treatment plan generated based on the planning image data to the actual geometry of the anatomical body part which may be determined from the surface geometry data since the incision foil is attached to the anatomical surface of the anatomical body part.

In a fourth aspect, the embodiments of the claimed invention are directed to a computer program product comprising instructions which, when the program is executed by at least one computer, causes the at least one computer to carry out method according to the third aspect. A computer program stored on a disc is a data file, and when the file is read out and transmitted it becomes a data stream for example in the form of a (physical, for example electrical, for example technically generated) signal. For example, the signal, for example the signal wave is constituted to be transmitted via a computer network, for example LAN, WLAN, WAN, mobile network, for example the internet. For example, the signal, is constituted to be transmitted by optic or acoustic data transmission. The embodiments of the claimed invention according to the fourth aspect therefore may alternatively or additionally relate to a computer program product storing data representative of the aforementioned program, i.e. comprising the program.

In a fifth aspect, the invention is directed to a computer-readable storage medium on which the program according to the second aspect is stored. The program storage medium is for example non-transitory.

In a sixth aspect, the invention is directed to at least one computer (for example, a computer), comprising at least one processor (for example, a processor), wherein the program according to the second aspect is executed by the processor, or wherein the at least one computer comprises the computer-readable storage medium according to the third aspect.

For example, the computer of the system according to the second aspect is the computer according to the sixth aspect.

Alternatively or additionally, the invention according to the fifth aspect is directed to a for example non-transitory computer-readable program storage medium storing a program for causing the computer according to the fourth aspect to execute the data processing steps of the method according to the third aspect.

For example, the invention does not involve or in particular comprise or encompass an invasive step which would represent a substantial physical interference with the body requiring professional medical expertise to be carried out and entailing a substantial health risk even when carried out with the required professional care and expertise.

For example, the invention does not comprise a step of conducting a surgical procedure on the anatomical body part on which the incision foil has been placed. More particularly, the invention does not involve or in particular comprise or encompass any surgical or therapeutic activity. The invention is instead directed as applicable to geometry of an anatomical surface using an adhesive incision foil. For this reason alone, no surgical or therapeutic activity and in particular no surgical or therapeutic step is necessitated or implied by carrying out the invention.

The present invention also relates to the use of the system according to the second aspect or any embodiment thereof for example for determining a deformation of the incision foil. Microscope navigation could also make use of this invention by using the camera in the microscope for detection of the foil.

Definitions

In this section, definitions for specific terminology used in this disclosure are offered which also form part of the present disclosure.

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term computer includes a server resource. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a virtual reality device or an augmented reality device (also referred to as virtual reality glasses or augmented reality glasses) which can be used as "goggles" for navigating. A specific example of such augmented reality glasses is Google Glass (a trademark of Google, Inc.). An augmented reality device or a virtual reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. An example of such a digital lightbox is Buzz®, a product of Brainlab AG. The monitor may also be the monitor of a portable, for example handheld, device such as a smart phone or personal digital assistant or digital media player.

The example embodiment also relates to a computer program stored on a non-transient storage medium and comprising instructions that, when executed by a processor device of a computer, cause the computer to carry out the method or methods, for example, the steps of the method or methods, described herein and/or to a computer-readable storage medium (for example, a non-transitory computer-readable storage medium) on which the program is stored and/or to a computer comprising said program storage medium, which for example comprises code means which are adapted to perform any or all of the method steps described herein. The example embodiment also relates to a computer comprising at least one processor and/or the aforementioned computer-readable storage medium and for example a memory, wherein the program is executed by the processor.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing (and e.g. outputting) the data by means of a computer and for example within the framework of the method in accordance with the invention. A step of "determining" as described herein for example comprises or consists of issuing a command to perform the determination described herein. For example, the step comprises or consists of issuing a command to cause a computer, for example a remote computer, for example a remote server, for example in the cloud, to perform the determination. Alternatively or additionally, a step of "determination" as described herein for example comprises or consists of receiving the data resulting from the determination described herein, for example receiving the resulting data from the remote computer, for example from that remote computer which has been caused to perform the determination. The meaning of "acquiring data" also for example encompasses the scenario in which the data are received or retrieved by (e.g. input to) the computer implemented method or program, for example from another program, a previous method step or a data storage medium, for example for further processing by the computer implemented method or program. Generation of the data to be acquired may but need not be part of the method in accordance with the invention. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired.

The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

BRIEF DESCRIPTION OF THE DRAWINGS

In the following, the invention is described with reference to the appended figures which give background explanations and represent specific embodiments of the invention. The scope of the invention is however not limited to the specific features disclosed in the context of the figures, wherein.

DESCRIPTION OF EMBODIMENTS

Figure 1:
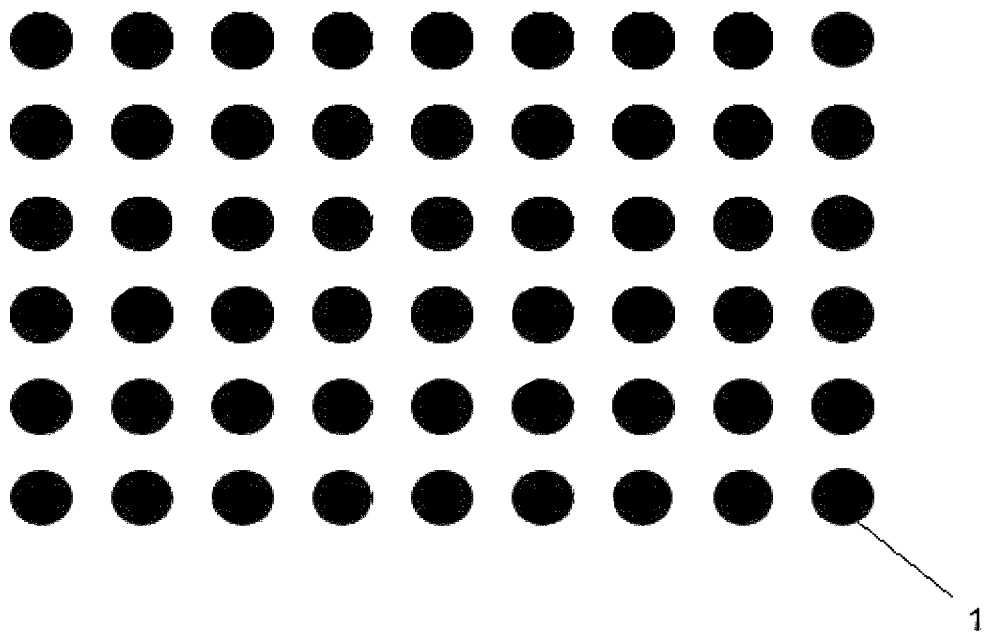
FIG. 1 shows a dotted pattern usable on the incision foil.
Figure 2:
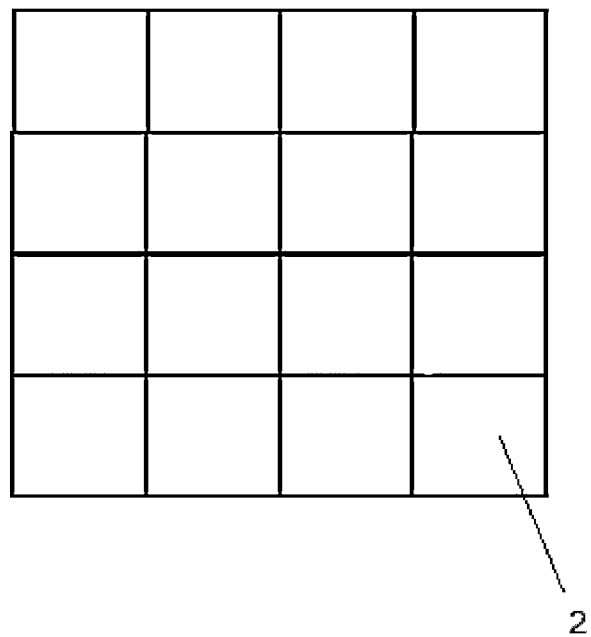
FIG. 2 shows a rectangular pattern usable on the incision foil.

FIGS. 1 and 2 illustrate types of regular, specifically periodic, patterns usable on the incision foil according to the first aspect. FIG. 1 shows a pattern of finite size consisting of a continuous arrangement of dots of all the same size at constant spacing between one another. FIG. 2 shows a pattern consisting of lines defining a continuous arrangement quadratic rectangles of finite size, the rectangles all being of the same size.

Figure 3:
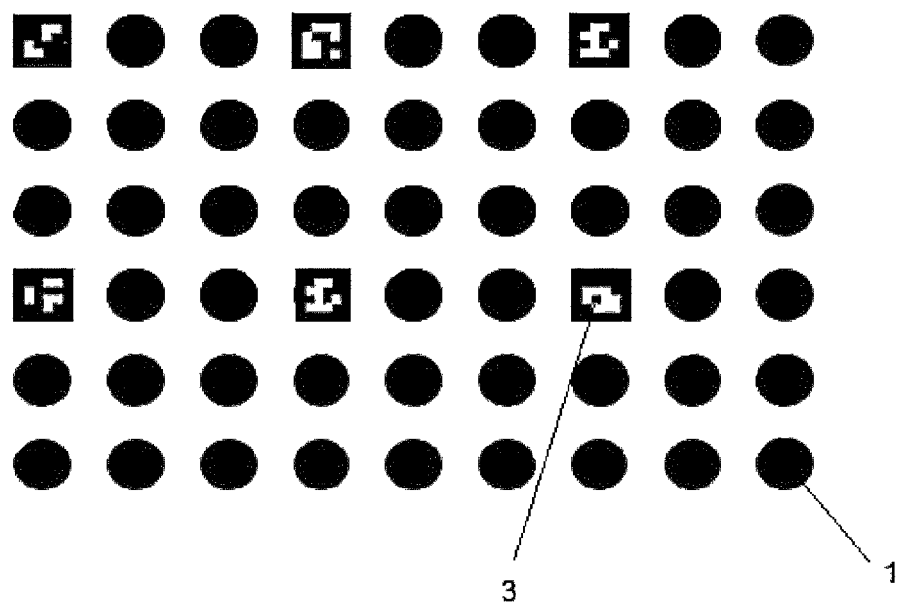
FIG. 3 shows a dotted pattern with embedded index codes.
Figure 4:
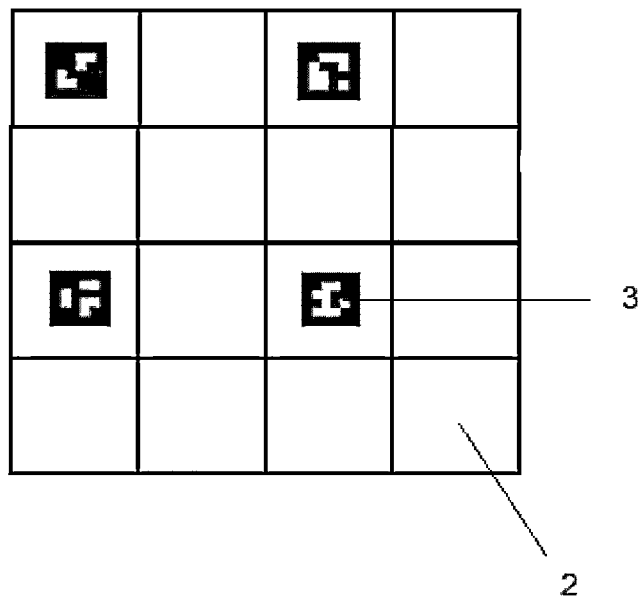
FIG. 4 shows a rectangular pattern with embedded index codes.

FIGS. 3 and 4, respectively, show the patterns of FIGS. 1 and 2, respectively, with additionally an index code, for example a grid index code such as a QR code, embedded in the dots or rectangles, respectively. In these examples, the pattern includes markers with known one-to-one correspondence to their position and/or orientation relative to the pattern, which allows to orient the pattern correctly in camera coordinates and allows to identify the pattern even if parts of the pattern are hidden in trenches (as illustrated in FIG. 5).

Figure 5:
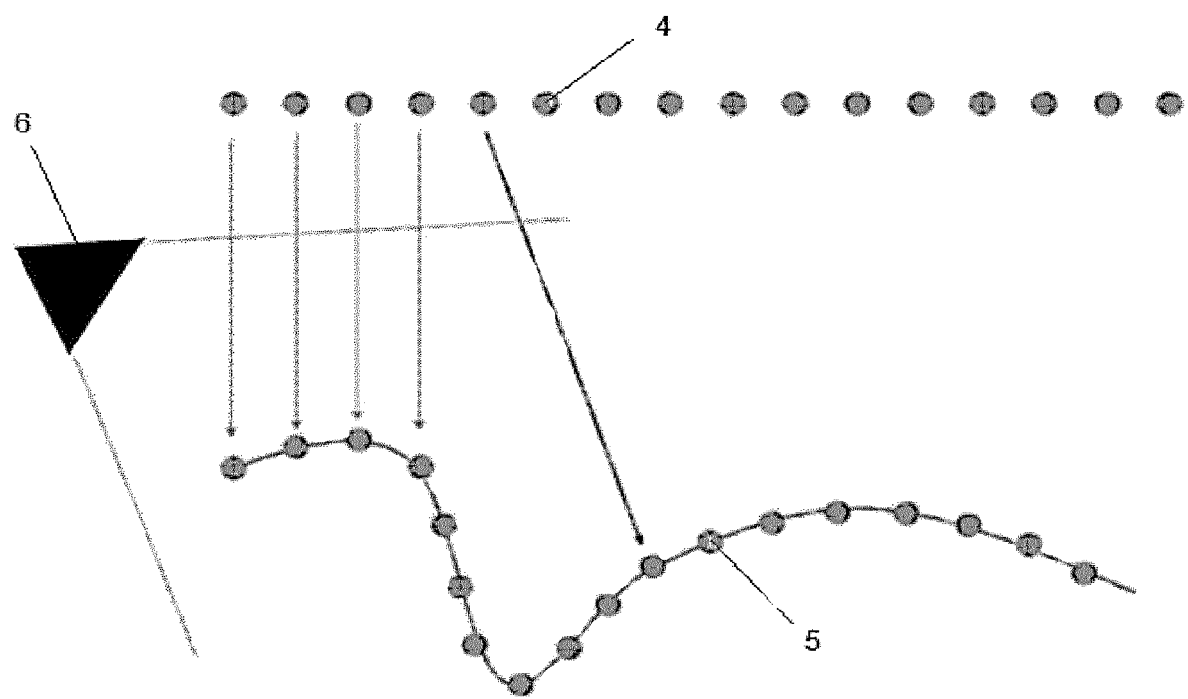
FIG. 5 illustrates a deformation of the pattern.

FIG. 5 illustrates the deformation of the incision foil and thus the pattern on it when for example the anatomical surface onto which the incision foil has been attached is deformed. The dots 5 of the pattern change their position in the direction vertical to the plain of the undeformed pattern but maintain their distance to each other since the foil cannot be stretched. Thus, the detection device 6, for example a camera, receives a different image of the pattern compared to the undeformed state. The received image can be analysed using a known algorithm to determine the geometry, for example shape, of the deformed incision foil. This can be done using the characteristic distance calculated from the image of the deformed incision foil. If the undeformed state is known, the change of geometry of the pattern between the undeformed and the deformed state can be used to determine the change of geometry of the underlying anatomical surface and therefore the anatomical body part to which the anatomical surface belongs. FIG. 5 also shows an example which is based on individual feature identification (as in FIGS. 3 and 4) because some features are not visible on the deformed surface from the shown perspective of the camera. A correct one-to-one correspondence of features is therefore only possible if each feature in the camera image can be individually identified. If there is no feature indexing, then one can only rely on counting features in the camera image, which would fail in this case.

Figure 6:
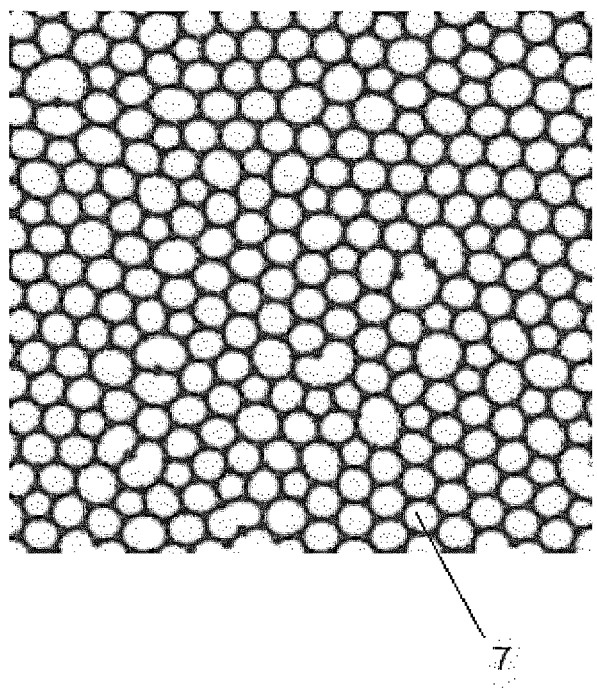
FIG. 6 illustrates a first type of irregular pattern.
Figure 7:
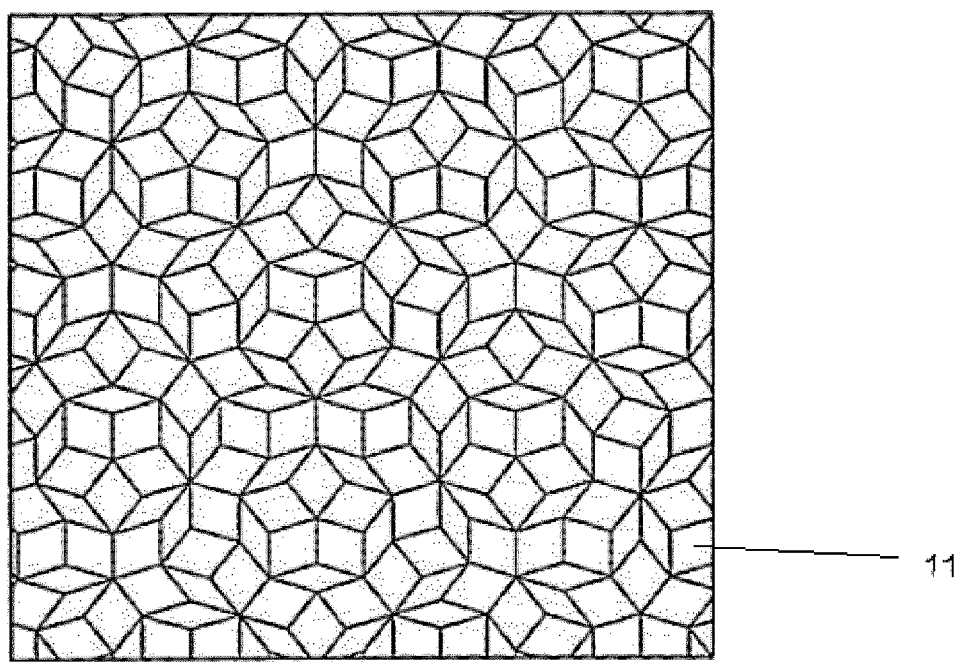
FIG. 7 illustrates a second type of irregular pattern.

FIGS. 6 and 7 illustrate that the pattern 7, 11 has for example a characteristic distance between its defining constituents. For example, it can be amorphous, quasi-crystalline, periodic or a square pattern. A change in the characteristic distance in the image acquired by the detection device can be used to determine a change in the geometry of the incision foil.

Figure 8:
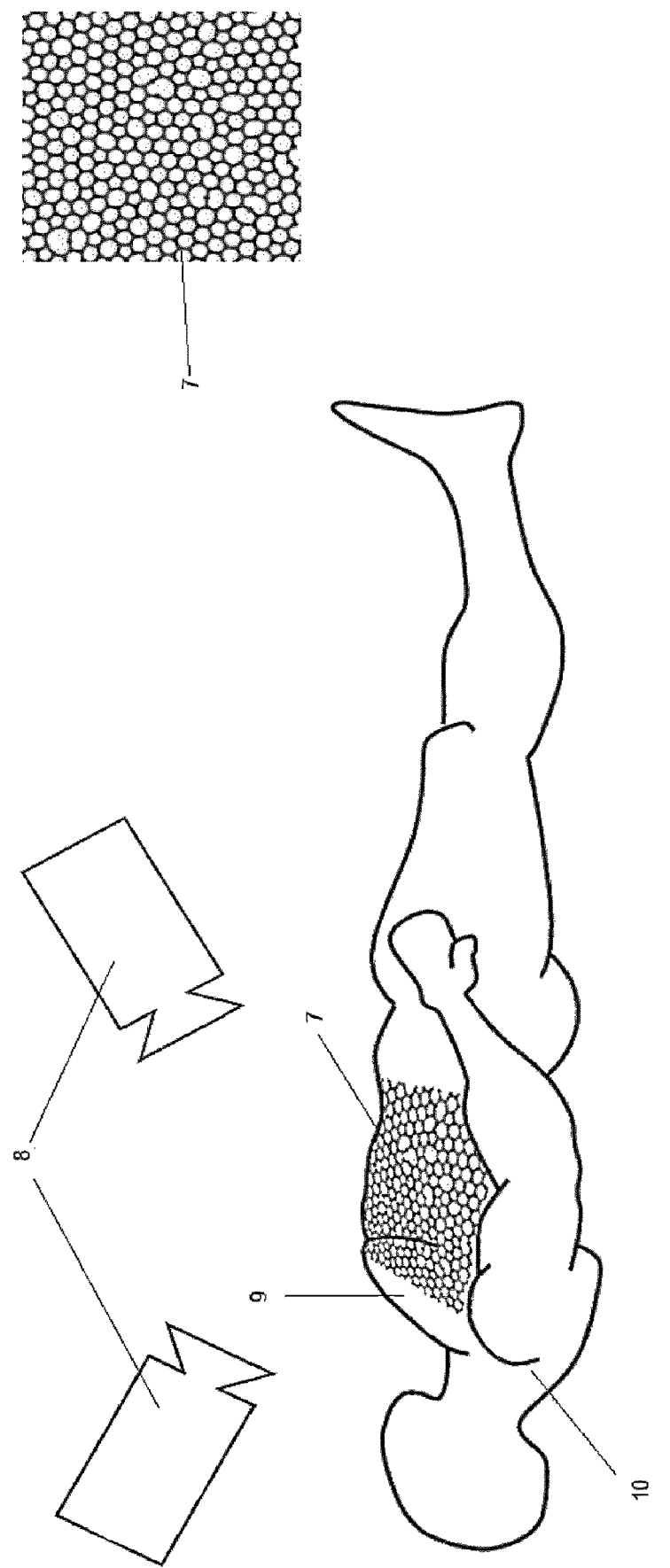
FIG. 8 illustrates an application of the incision foil attached to an anatomical body part.

FIG. 8 shows an incision foil comprising a pattern 7 on its visible surface when it is attached to an anatomical body part 9 of a patient 10. The pattern 7 is detected by a stereo camera comprising two imaging units 8 having the anatomical body part 9 in their field of view.

Figure 9:
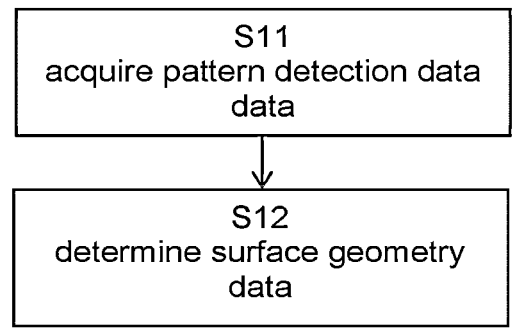
FIG. 9 illustrates the basic steps of the method according to the first aspect.

FIG. 9 illustrates the basic steps of the method according to the third aspect, in which step S11 encompasses acquisition of the pattern detection data and step S12 encompasses determination of the surface geometry data.

Figure 10:
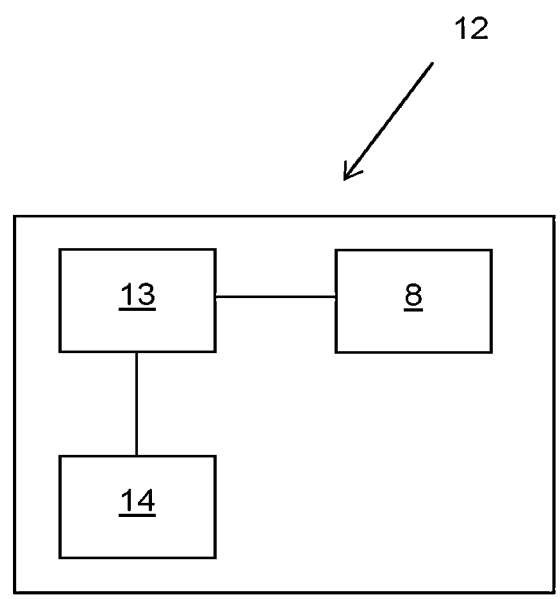
FIG. 10 is a schematic illustration of the system according to the second aspect.

FIG. 10 is a schematic illustration of the medical system 12 according to the second aspect. The system is in its entirety identified by reference sign 12 and comprises a computer 13, an electronic data storage device (such as a hard disc) 14 for storing at least the patient data and the detection device 8 (such as a camera). The components of the medical system 12 have the functionalities and properties explained above with regard to the second aspect of this disclosure.

Figure 11:
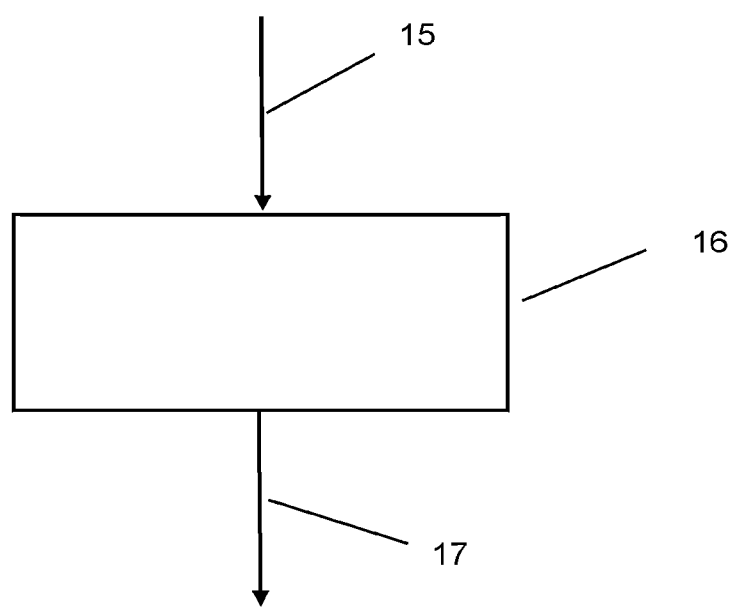
FIG. 11 shows an embodiment of the present invention, specifically the method according to the first aspect.

FIG. 11 illustrates an embodiment of the present invention that includes all essential features of the invention. In this embodiment, the entire data processing which is part of the method according to the first aspect is performed by a computer. Reference sign 15 denotes the input of data acquired by the method according to the first aspect into the computer 16 and reference sign 17 denotes the output of data determined by the method according to the third aspect.

A concise account of the present invention can be worded as follows:

1. The incision foil is put on patient's anatomy of interest (skin surface, surface of an organ, cavity). It is sterile so that it can be used during a surgical procedure and be left on the patient even when incisions are performed through it. The incision foil can be designed and used as a surgical incise drape (incision film) which is standard of care in many surgical areas. The incision foil is adhesive, soft and smooth so that it matches and models the patient's anatomy surface as precisely as possible.

2. A digital video camera (mono, stereo, or multiple cameras calibrated to each other) captures an image of the attached incision foil. The camera is for example a standard computer vision camera of a head-mounted mixed reality headset, a video camera of a surgical microscope, a video camera integrated in an operation room lamp, or any other image source capturing the scene.

3. Images are processed in real time directly on the device the camera is attached to (e.g. mixed reality headset) or sent to a remote computer (located for example in the cloud) for processing.

4. Known features of the pattern are detected in the image (e.g. grid lines, corners, intersections) and correspondences to original pattern are determined. The pattern can be coded so that correspondences between image points and points of the printed pattern can be quickly found and 3D information easily be retrieved.

5. A point cloud or surface mesh is reconstructed from the calculated point correspondences.

6. Procedure can be repeated continuously evaluating captured images in order to:
   a. refine a model of the anatomical surface by evaluating images captured from different view angles or improving on resolution (for example, results from all evaluate camera frames are integrated and merged in one refined model); and/or
   b. detect changes to the appearance of the surface in the image due to e.g. skin movement and/or tissue shift in real time.

The invention claimed is:

1. A system comprising:
   an un-stretchable incision foil configured for placement at an incision site on a patient wherein the incision foil is adapted to be cut through during a surgical procedure that incises the patient through the incision foil at the incision site, the incision foil comprising:
   a first side comprising an adhesive portion;
   a non-adhesive second side opposite the first side; and
   a pattern provided on a surface of the incision foil, wherein the pattern comprises individually identifiable marker features with known correspondence to their position and/or orientation relative to the pattern;
   a detection device operable to image the pattern comprising the marker features;
   an electronic data storage device storing pattern template data describing a predetermined pattern of the pattern comprising the marker features for the incision foil being disposed in a plane defining a known initial undeformed planar geometry of the incision foil prior to use of the incision foil in a procedure; and
   a computer coupled with the detection device and with the electronic data storage device, the computer being operable to receive, from the detection device, pattern detection data describing an appearance of the pattern comprising the marker features imaged by the detection device during use of the incision foil in the procedure wherein portions of the pattern are hidden from imaging by the detection device by the incision foil being in a deformed geometry during use of the incision foil in the procedure, the computer being operable to receive the pattern template data from the electronic data storage device,
   wherein the computer is configured to determine, based on the individually identifiable marker features imaged by the detection device, each with known correspondence to their individual position and/or orientation relative to the pattern and described by the pattern detection data, and the pattern template data, surface geometry data describing a geometry of the incision foil in the deformed geometry that is different from the known initial undeformed planar geometry, wherein the surface geometry data is determined based on a deviation of positions of the marker features described by the pattern template data to positions described by the pattern detection data, wherein portions of the pattern change their position away from the plane defining the known initial undeformed geometry of the incision foil in a direction perpendicular to the plane defining the known initial undeformed geometry of the incision foil while the portions of the pattern also maintaining their distances relative to each other along the surface of the incision foil based on the incision foil being substantially un-stretchable.

2. The system according to claim 1, wherein the pattern is provided on a portion of the non-adhesive side of the incision foil at a position opposite the adhesive portion.

3. The system according to claim 1, wherein the appearance of the pattern detected by the detection device changes when the incision foil is deformed.

4. The system according to claim 1, wherein the pattern comprises a regular pattern.

5. The system according to claim 4, wherein the regular pattern comprises a symmetric pattern or a periodic pattern.

6. The system according to claim 1, wherein the pattern comprises an irregular pattern.

7. The system according to claim 6, wherein the irregular pattern comprises an unsymmetric pattern or an aperiodic pattern.

8. A computer-implemented method of determining a geometry of an anatomical surface of an associated anatomical body part, the method comprising:
   acquiring pattern detection data obtained by imaging a pattern by an associated detection device, wherein the detection data describes an appearance of the pattern comprising individually identifiable marker features provided on a surface of an un-stretchable incision foil disposed on a patient, wherein the incision foil is adapted to be cut through during a surgical procedure that incises the patient through the incision foil at the incision site, wherein the incision foil has a first side comprising an adhesive position and a non-adhesive second side opposite to the first side, wherein the marker features of the pattern each have a known correspondence between their individual position and/or orientation relative to the pattern, wherein the adhesive portion of the incision foil is attached to the anatomical surface of the anatomical body part, wherein portions of the pattern of the incision foil attached to the anatomical surface of the anatomical body part when imaged by the associated detection device are hidden from the imaging by the incision foil being in a deformed geometry during use of the incision foil in the procedure;

determining surface geometry data based on the individually identifiable marker features imaged by the detection device, each with the known correspondence to their individual position and/or orientation relative to the pattern and described by the pattern detection data, wherein the surface geometry data describes the geometry of the anatomical surface;

acquiring pattern template data describing a predetermined foil appearance of the pattern comprising the marker features provided on the incision foil for the incision foil being disposed in a plane defining a predetermined initial undeformed planar geometry of the incision foil prior to use of the incision foil in a procedure; and determining surface geometry data based on:
the pattern detection data;
the pattern template data; and
a deviation of positions of the marker features from prior to use positions described by the pattern template data to during use positions described by the pattern detection data, wherein portions of the pattern change their position for the incision foil disposed in a deformed geometry that is different from the initial undeformed planar geometry, wherein the surface geometry data is determined based on portions of the pattern comprising the marker features changing their position away from the plane defining the known initial undeformed geometry of the incision foil in a direction perpendicular to the plane defining the known initial undeformed geometry of the incision foil while the portions of the pattern comprising the marker features also maintaining their distances relative to each other along the surface of the incision foil based on the incision foil being substantially un-stretchable, wherein the surface geometry data describes the geometry of the anatomical surface of the associated anatomical body part.

9. The method according to claim 8, wherein:
the determining the surface geometry data comprises determining the surface geometry by a surface reconstruction using mono-photogrammetry or stereo-photogrammetry.

10. A non-transitory computer-readable storage medium storing instructions that, when the instructions are executed by a computer, cause the computer to perform a method of determining a geometry of an anatomical surface of an associated anatomical body part by:

acquiring pattern detection data obtained by imaging a pattern by an associated detection device, wherein the detection data describes an appearance of the pattern comprising individually identifiable marker features provided on a surface of an un-stretchable incision foil disposed on a patient wherein the incision foil is adapted to be cut through during a surgical procedure that incises the patient through the incision foil at the incision site, wherein the incision foil has a first side comprising an adhesive position and a non-adhesive second side opposite to the first side, wherein the marker features of the pattern each have a known correspondence between their individual position and/or orientation relative to the pattern, wherein the adhesive portion of the incision foil is attached to the anatomical surface of the anatomical body part, wherein portions of the pattern of the incision foil attached to the anatomical surface of the anatomical body part when imaged by the associated detection device are hidden from the imaging by the incision foil being in a deformed geometry during use of the incision foil in the procedure;

determining surface geometry data based on the individually identifiable marker features imaged by the detection device, each with the known correspondence to their individual position and/or orientation relative to the pattern and described by the pattern detection data, wherein the surface geometry data describes the geometry of the anatomical surface;

acquiring pattern template data describing a predetermined foil appearance of the pattern comprising the marker features provided on the incision foil for the incision foil being disposed in a plane defining a known initial undeformed planar geometry of the incision foil prior to use of the incision foil in a procedure; and determining surface geometry data based on the pattern detection data, the pattern template data, and deviation of positions of the marker features from prior to use positions described by the pattern template data to during use positions described by the pattern detection data, wherein the surface geometry data describes the geometry of the anatomical surface of the associated anatomical body part, wherein the surface geometry data is determined based on portions of the pattern comprising the marker features changing their position away from the plane defining the known initial undeformed geometry of the incision foil in a direction perpendicular to the plane defining the known initial undeformed geometry of the incision foil while the portions of the pattern comprising the marker features also maintaining their distances relative to each other along the surface of the incision foil based on the incision foil being substantially un-stretchable.

11. The non-transitory computer-readable storage medium according to claim 10, wherein:
the determining the surface geometry data comprises determining the surface geometry by a surface reconstruction using mono-photogrammetry or stereo-photogrammetry.

12. A computer system comprising:
at least one processor; and
a computer-readable storage medium storing instructions that, when the instructions are executed by the at least one processor, cause the at least one processor to perform a method of determining a geometry of an anatomical surface of an associated anatomical body part by:

acquiring pattern detection data obtained by imaging a pattern by an associated detection device, wherein the detection data describes an appearance of the pattern comprising individually identifiable features provided on a surface of an un-stretchable incision foil disposed on a patient, wherein the incision foil is adapted to be cut through during a surgical procedure that incises the patient through the incision foil at the incision site, wherein the incision foil has a first side comprising an adhesive position and a non-adhesive second side opposite to the first side, wherein the marker features of the pattern each have a known correspondence between their individual position and/or orientation relative to the pattern, wherein the adhesive portion of the incision foil is attached to the anatomical surface of the anatomical body part;

determining surface geometry data based on the individually identifiable marker features imaged by the detection device, each with the known correspondence to their individual position and/or orientation relative to the pattern and described by the pattern detection data, wherein the surface geometry data describes the geometry of the anatomical surface;

acquiring pattern template data describing a predetermined foil appearance of the pattern comprising the marker features provided on the incision foil for the incision foil being disposed in a plane defining known initial undeformed planar geometry of the incision foil prior to use of the incision foil in a procedure; and determining surface geometry data based on the pattern detection data, the pattern template data, and deviation of positions of the marker features from prior to use positions described by the pattern template data to during use positions described by the pattern detection data, wherein the surface geometry data describes the geometry of the anatomical surface of the associated anatomical body part, wherein the surface geometry data is determined based on portions of the pattern comprising the marker features changing their position away from the plane defining the known initial undeformed geometry of the incision foil in a direction perpendicular to the plane defining the known initial undeformed geometry of the incision foil while the portions of the pattern comprising the marker features also maintaining their distances relative to each other along the surface of the incision foil based on the incision foil being substantially un-stretchable.

* * * * *